United States Patent
Luo et al.

(10) Patent No.: US 7,930,111 B2
(45) Date of Patent: Apr. 19, 2011

(54) SYNTHESIZED SYNCHRONOUS SAMPLING AND ACCELERATION ENVELOPING FOR DIFFERENTIAL BEARING DAMAGE SIGNATURE

(75) Inventors: Huageng Luo, Clifton Park, NY (US); George Hanna Ghanime, Ballston Spa, NY (US); Hai Qiu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 213 days.

(21) Appl. No.: 12/284,441

(22) Filed: Sep. 22, 2008

(65) Prior Publication Data

US 2010/0071469 A1   Mar. 25, 2010

(51) Int. Cl.
*G01B 3/34* (2006.01)
(52) U.S. Cl. ................. 702/34; 702/33; 702/36; 702/44
(58) Field of Classification Search ............... 702/33–35, 702/79, 113, 141–142, 149, 176–178, 182–183, 702/185; 73/1.82, 1.84, 593, 658–660; 384/623; 701/93
See application file for complete search history.

(56) References Cited

U.S. PATENT DOCUMENTS

| | | | |
|---|---|---|---|
| 4,237,454 A | 12/1980 | Meyer | 340/682 |
| 4,493,042 A | 1/1985 | Shima et al. | 364/507 |
| 4,884,449 A | 12/1989 | Nishimoto et al. | 73/660 |
| 5,381,692 A | 1/1995 | Winslow et al. | 73/593 |
| 5,477,730 A | 12/1995 | Carter | 73/609 |
| 5,895,857 A * | 4/1999 | Robinson et al. | 73/660 |
| 6,789,025 B2 | 9/2004 | Boerhout | 702/56 |
| 6,847,917 B2 * | 1/2005 | Bechhoefer | 702/183 |
| 2003/0066352 A1 | 4/2003 | Leamy et al. | 73/593 |
| 2003/0106375 A1 | 6/2003 | Sabini et al. | 73/593 |
| 2005/0119840 A1 | 6/2005 | Astley et al. | 702/56 |
| 2005/0209814 A1 * | 9/2005 | Song | 702/145 |
| 2006/0218927 A1 | 10/2006 | Singh et al. | 60/772 |
| 2006/0218935 A1 | 10/2006 | Singh et al. | 60/803 |
| 2006/0222278 A1 | 10/2006 | Singh et al. | 384/448 |
| 2008/0033695 A1 | 2/2008 | Sahara et al. | |

FOREIGN PATENT DOCUMENTS

EP   1304463   4/2003

OTHER PUBLICATIONS

PCT Search Report, PCT/US2009/054826, Jan. 6, 2010.
PCT Written Opinion, PCT/US2009/054826, Jan. 15, 2010.

* cited by examiner

*Primary Examiner* — Eliseo Ramos Feliciano
*Assistant Examiner* — Felix E Suarez
(74) *Attorney, Agent, or Firm* — Penny A. Clarke

(57) ABSTRACT

A system for detecting differential bearing damages includes a synthesized tachometer that generates a tachometer signal corresponding to the race speed difference of a bearing assembly such that the bearing damage speed difference dependency can be eliminated and the damage features can be enhanced. The system also includes acceleration enveloping in the cycle domain to further enhance the damage signatures.

23 Claims, 7 Drawing Sheets

US 7,930,111 B2

SYNTHESIZED SYNCHRONOUS SAMPLING AND ACCELERATION ENVELOPING FOR DIFFERENTIAL BEARING DAMAGE SIGNATURE

BACKGROUND

The invention relates generally to engine bearing vibration signatures, and more particularly to a sampling and acceleration enveloping technique for enhancing differential bearing damage signatures associated with engine differential bearings.

Differential bearings are some of the most vulnerable parts of an engine and are also some of most difficult parts of an engine for which to monitor the operational condition.

Vibration signatures provide the most reliable early warning data associated with regular rolling-element bearing systems. In that regard, the acceleration enveloping based technique has existed for many years. The synchronous sampling technique is also widely used in bearing signature enhancement, especially in variable speed applications.

Synchronous sampling is a technique for converting equal time sampling to equal shaft circumferential angle sampling, so that the rotor speed dependency is eliminated. This is usually achieved by installing an encoder on to the bearing which is used to monitor the shaft operation by counting the physical events of the rotating part passing through a stationary detector.

Both bearing races in a differential bearing operation however, are in motion, and the race speeds are usually not accurately controlled during bearing operations. Further, the differential bearing assembly is buried under other mechanical components; and the bearing signatures are proportional to the speed difference between the races. Synchronous sampling therefore is required to extract the inherently small and speed difference dependent signatures. Encoders for the differential speed are not physically feasible for a differential bearing due to the moving races.

It would be advantageous to provide a sampling technique that overcomes the disadvantages described above associated with traditional sampling techniques for ascertaining differential bearing damage signatures during bearing operations.

BRIEF DESCRIPTION

Briefly, in accordance with one embodiment of the invention, a method of detecting differential bearing damages comprises:

generating a plurality of speed signals for inner and outer rotating bearing races;

synthesizing a tachometer corresponding to a speed difference of the inner and outer races; and synchronously sampling bearing vibration data in response to the synthesized speed difference tachometer signal to generate synthesized cycle domain data corresponding to at least one bearing damage signature.

According to another embodiment of the invention, a method of enhancing a differential bearing damage signature comprises:

generating a plurality of speed signals for each differential bearing race;

synthesizing at least one tachometer signal for at least one differential bearing race; and synchronously sampling vibration data associated with the differential bearing with respect to race speed differences in response to the plurality of speed signals and the at least one synthesized tachometer signal to generate synthesized cycle domain data corresponding to at least one bearing damage signature.

According to yet another embodiment of the invention, a system for detecting bearing damage comprises:

a synthesized tachometer configured to generate a speed signal for a bearing assembly such that the speed signal corresponds to the approximate location of a missing tachometer signal based on race speeds of the bearing assembly; and a sampling mechanism configured to synchronously sample vibration data associated with the bearing assembly based on the speed signal to generate synthesized cycle domain data corresponding to at least one bearing assembly damage signature.

DRAWINGS

These and other features, aspects, and advantages of the present invention will become better understood when the following detailed description is read with reference to the accompanying drawings in which like characters represent like parts throughout the drawings, wherein.

Figure 1:
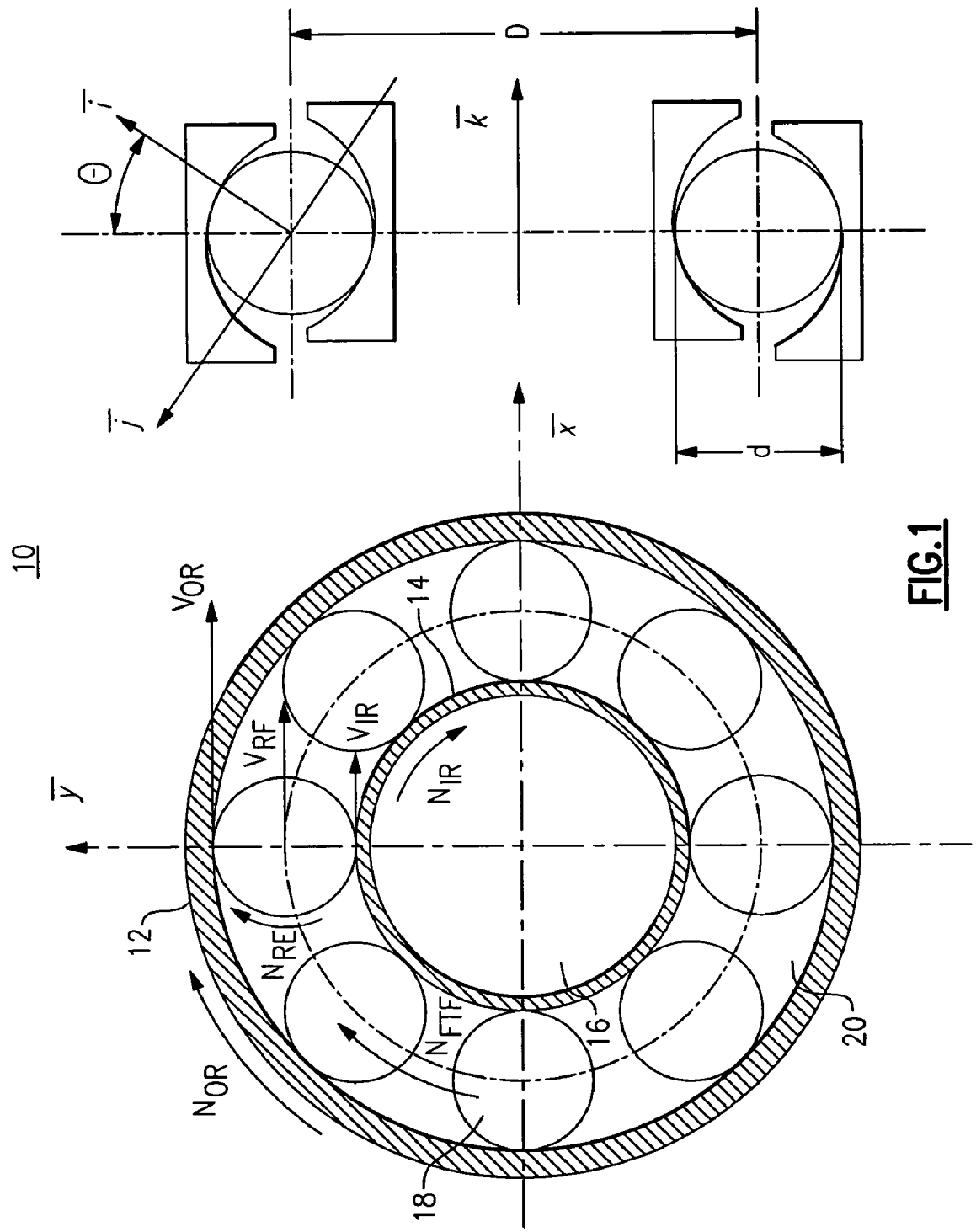
FIG. 1 illustrates a differential ball bearing assembly known in the art.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

A background in acceleration enveloping and synchronous sampling principles is now set forth below with reference to FIG. 1 that illustrates a differential ball bearing assembly 10 known in the art and FIG. 2 that depicts a flow chart illustrating an acceleration enveloping signal processing technique that is known in the art for enhancing a rotating bearing damage signature in order to facilitate a better understanding of the embodiments of the invention described below with reference to FIGS. 3-6. Anti-friction bearings, i.e. bearings containing rolling elements like rollers or balls, produce vibration excitation forces at specific frequencies dependent on the bearing geometry and rotation speed. These vibration frequencies are called bearing tones. All such bearings, regardless of their condition, will produce some level of bearing tones that increase in level as the bearing deteriorates.

Generally, there are four frequencies associated with a rolling element bearing. These include:

1) Cage frequency or Fundamental Train Frequency (FTF);
2) Rolling element frequency;
3) Ball passing inner raceway frequency; and
4) Ball passing outer raceway frequency.

In many industrial applications, the outer raceway 12 is usually fixed and the inner raceway 14 is rotating with the shaft 16. However, in the most general case, both inner raceway 14 and outer raceway 12 can be rotating at different speeds. As shown in FIG. 1, the outer raceway 12 is rotating at speed $N_{OR}$ while the inner raceway 14 is rotating at speed $N_{IR}$. At the contact points between a rolling element 18 and raceways 12, 14, the velocities are $$V_{OR} = \frac{\pi N_{OR} D}{60}\left(1 + \frac{d}{D}\cos\theta\right). \tag{1}$$

and $$V_{IR} = \frac{\pi N_{IR} D}{60}\left(1 - \frac{d}{D}\cos\theta\right), \tag{2}$$

where D and d represent the dimensions shown in FIG. 1. By assuming perfect rolling between the rolling elements 18 and the raceways 12, 14, the velocity at the center of the rolling element 18 or the cage 20 is $$V_{FTF} = \frac{V_{OR} + V_{IR}}{2} \tag{4}$$

$$= \frac{\pi D}{120}\left[N_{OR}\left(1 + \frac{d}{D}\cos\theta\right) + N_{IR}\left(1 - \frac{d}{D}\cos\theta\right)\right].$$

Thus the cage frequency is $$f_{FTF} = \frac{V_{FTF}}{\pi D} = \frac{1}{120}\left[N_{OR}\left(1 + \frac{d}{D}\cos\theta\right) + N_{IR}\left(1 - \frac{d}{D}\cos\theta\right)\right]. \tag{5}$$

The spin frequency for the rolling element 18 can be similarly determined assuming there is no slip at the interface of the rolling element (ball) 18 and the outer race contact point. At the contact point, the ball speed is $$\vec{V}_{OR} = \vec{V}_{RE} + \vec{\omega}_{Ball} \times \vec{r}, \tag{6}$$

where $\vec{V}_{OR}$ is the velocity of the outer race 12 at the contact point; $\vec{V}_{RE}$ is the velocity of the ball center; $\vec{r}$ is the vector from ball center to the contact point; and $\vec{\omega}_{Ball}$ is the ball absolute angular speed. The ball angular speed consists of two parts: the cage angular speed $\omega_{FTF}\vec{k}$ and the rolling element angular speed $\omega_{RE}\vec{j}$. Keeping in mind that the two components are not in the same direction.

$$\vec{\omega}_{Ball} = -\omega_{FTF}\vec{k} + \omega_{RE}\vec{j}. \tag{7}$$

and $$\vec{r} = \frac{d}{2}\vec{i}. \tag{8}$$

Substituting Eqs. (7) and (8) and projecting both sides on to the tangential direction, we have $$\frac{2\pi N_{OR} D}{120}\left(1 + \frac{d}{D}\cos\theta\right) = 2\pi f_{FTF}\frac{D}{2} + \begin{pmatrix} 2\pi f_{FTF}\frac{d}{2}\cos\theta + \\ 2\pi f_{RE}\frac{d}{2} \end{pmatrix}. \tag{9}$$

or $$f_{RE} = \frac{D}{d}\left(\frac{N_{OR}}{60} - f_{FTF}\right)\left(1 + \frac{d}{D}\cos\theta\right). \tag{10}$$

Substituting Eq. (5) into (10), we have $$f_{RE} = \frac{D}{120 d}\left(1 - \frac{d}{D}\cos\theta\right)\left(1 + \frac{d}{D}\cos\theta\right)|N_{OR} - N_{IR}|. \tag{11}$$

For a damage spot on a rolling element 18, the fundamental frequency will be $2f_{RE}$, since for each complete rotation of the rolling element 18 with respect to the cage 20, the spot will contact inner race 14 and outer race 12 once, respectively. On the other hand, for a damage spot on the outer race 12, each rolling element 18 will roll over the spot once in each revolution of the cage 20 with respect to the outer race 12, thus, $$f_{OR} = n\left(\frac{N_{OR}}{60} - f_{FTF}\right) = \frac{n}{120}\left(1 - \frac{d}{D}\cos\theta\right)|N_{OR} - N_{IR}|. \tag{12}$$

Similarly, for a inner race damage spot, we have $$f_{IR} = n\left(\frac{N_{IR}}{60} - f_{FTF}\right) = \frac{n}{120}\left(1 + \frac{d}{D}\cos\theta\right)|N_{OR} - N_{IR}|. \tag{13}$$

Acceleration Enveloping or demodulation is a signal processing technique that greatly enhances an analyst's ability to determine the condition of rotating equipment. Briefly speaking, the enveloping technique removes low frequency high amplitude signals and detects low amplitude high frequency components to enhance the damage signature. The isolated higher frequency defect signatures are then converted into frequency domain using rectification and envelope detection.

Figure 2:
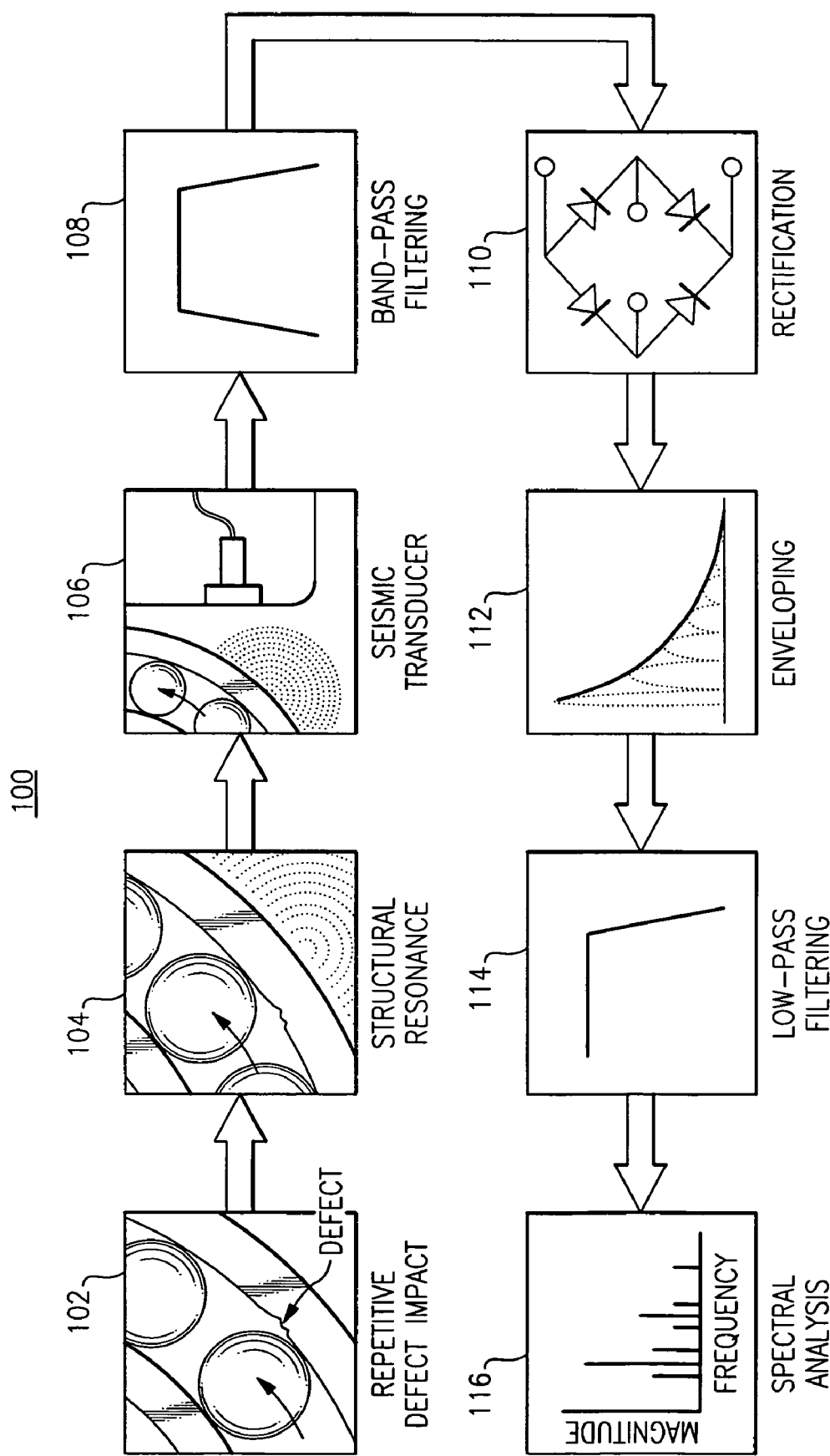
FIG. 2 is a flow chart illustrating an acceleration enveloping signal processing technique that is known in the art for enhancing a rotating bearing damage signature.

FIG. 2 depicts a flow chart illustrating an acceleration enveloping signal processing technique 100 that is known in the art for enhancing a rotating bearing damage signature. When a defect occurs in a bearing, a repetitive impact occurs during rotations. This kind of impact excites a broadband response in the system such as represented in blocks 102, 104, 106. However, the response levels from the defect impacts are usually very low. If the dynamic range is low, the harmonic signals are down in the noise floor. Even with a high dynamic range, the harmonics still disappear within a short span and cannot be seen. The key to detecting bearing faults is to capture the low amplitude bearing defect harmonics without including the high amplitude rotational vibration signals and system fundamental resonant frequency responses. To accomplish this, "band pass" filters are used to isolate the signature(s) such as represented in block 108. Once the high frequency damage response is captured, the signal goes through a rectification device such as represented in block 110, and the envelope of the signal is detected from the rectified signal such as represented in block 112. Applying low pass filtering such as represented in block 114 and FFT techniques such as represented in block 116 to the envelope signal will reveal the frequency or frequencies and amplitude(s), which is/are uniquely associated with the damaged bearing component.

Vibrations occur at multiples and submultiples of the shaft speed for rotating machinery. For example, if the shaft is rotating at 3600 rpm, which is 60 Hz, then responses at multiples of this frequency, sometimes at a fraction of this frequency, can be seen. These multiples are the orders (or harmonics in musical terms). The general relationship between the order ODR, the shaft speed RPM, and the frequency f in Hz is $$f = \frac{ODR \times RPM}{60}. \quad (14)$$

The purpose of using order instead of frequency Hz, is that the order remains constant with shaft speed; first order is always at the shaft speed; second order is always twice shaft speed, and so on.

A sampling technique other than sampling at equal increments of time, such as sampling at equal increments of rotation, must be used for rotating machinery applications. Sampling at equal increments of rotation is called synchronous sampling. The synchronous sampling technique is a very useful for rotating machinery related data processing, especially for those applications with varying shaft speeds.

If the Fourier transform is performed on the synchronously sampled data, the result is a set of data in a function of a frequency type scale; but now it is in increments of Orders not Hz. The order analysis can be achieved by conducting a regular FFT and then converting the frequency domain into an order domain, using the shaft speed signal for constant shaft speed cases. If the speed is changing over the length of the FFT, then the order domain amplitude will be smeared over a range of orders.

In dealing with signals from rotating machinery, synchronous sampling is preferable, but is difficult in practice. It is impossible to sample synchronously with some data acquisition equipment, in particular those with σ–δ type analog-to-digital converters (ADCs), where it must sample at regular time steps.

The present inventors recognized one solution is to use signal processing to digitally resample the data. With the correct signal processing algorithms, the data can be resampled from the initial equi speed time increment data into equi spaced angle increment data, with the help of a once-per-rev tachometer signal from the shaft.

A once per revolution signal cannot be physically obtained when both races are moving since the damage frequencies are a function of race speed difference. Keeping the above principles in mind, a synthesized synchronous sampling technique to achieve the desired effective synchronous sampling for such applications is now described below with reference to FIGS. 3-6 according to one embodiment of the invention.

Figure 3:
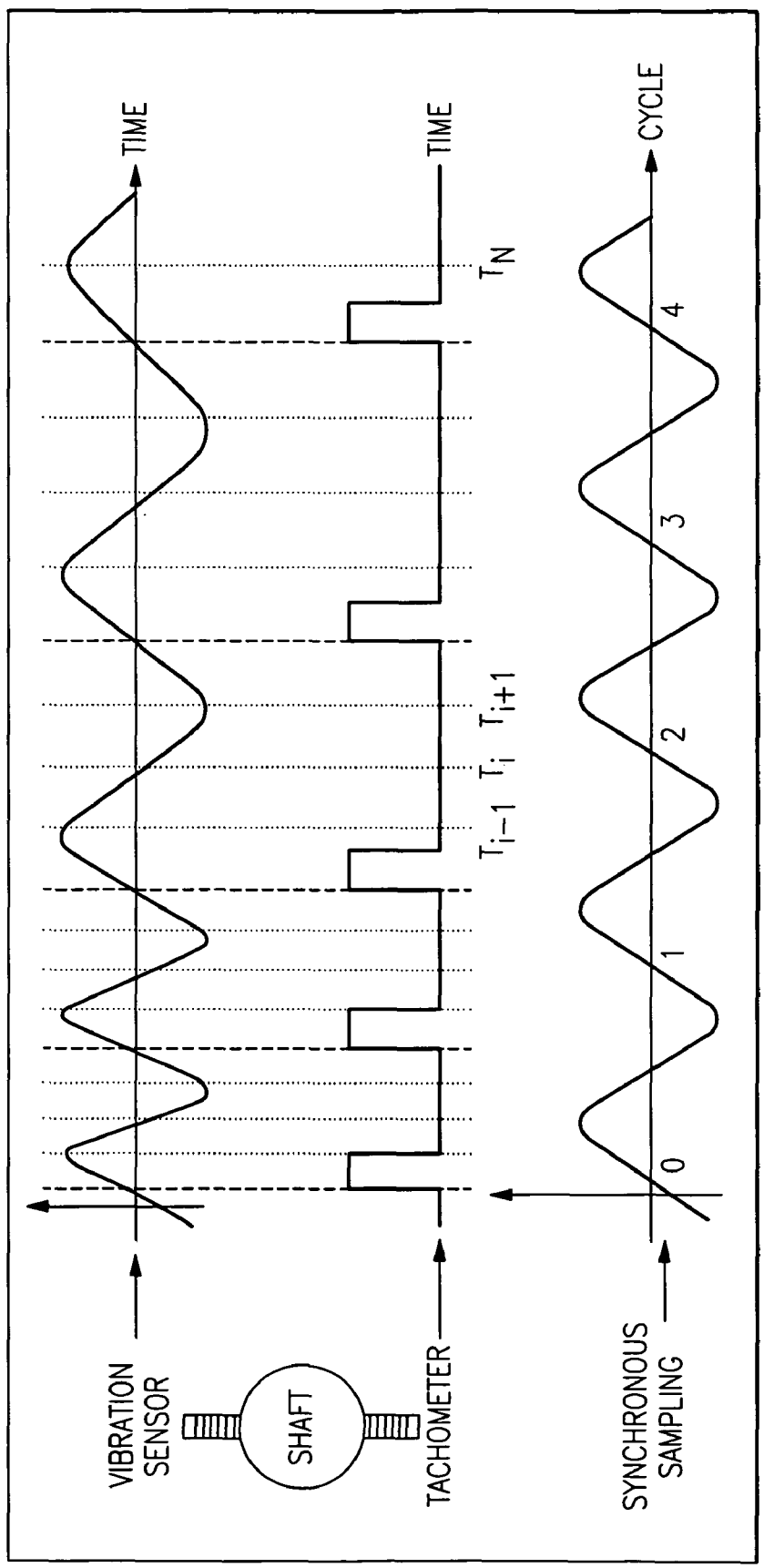
FIG. 3 is a waveform diagram illustrating conversion of equal time sampled data generated via a tachometer into equal space data according to one embodiment of the invention.
Figure 4:
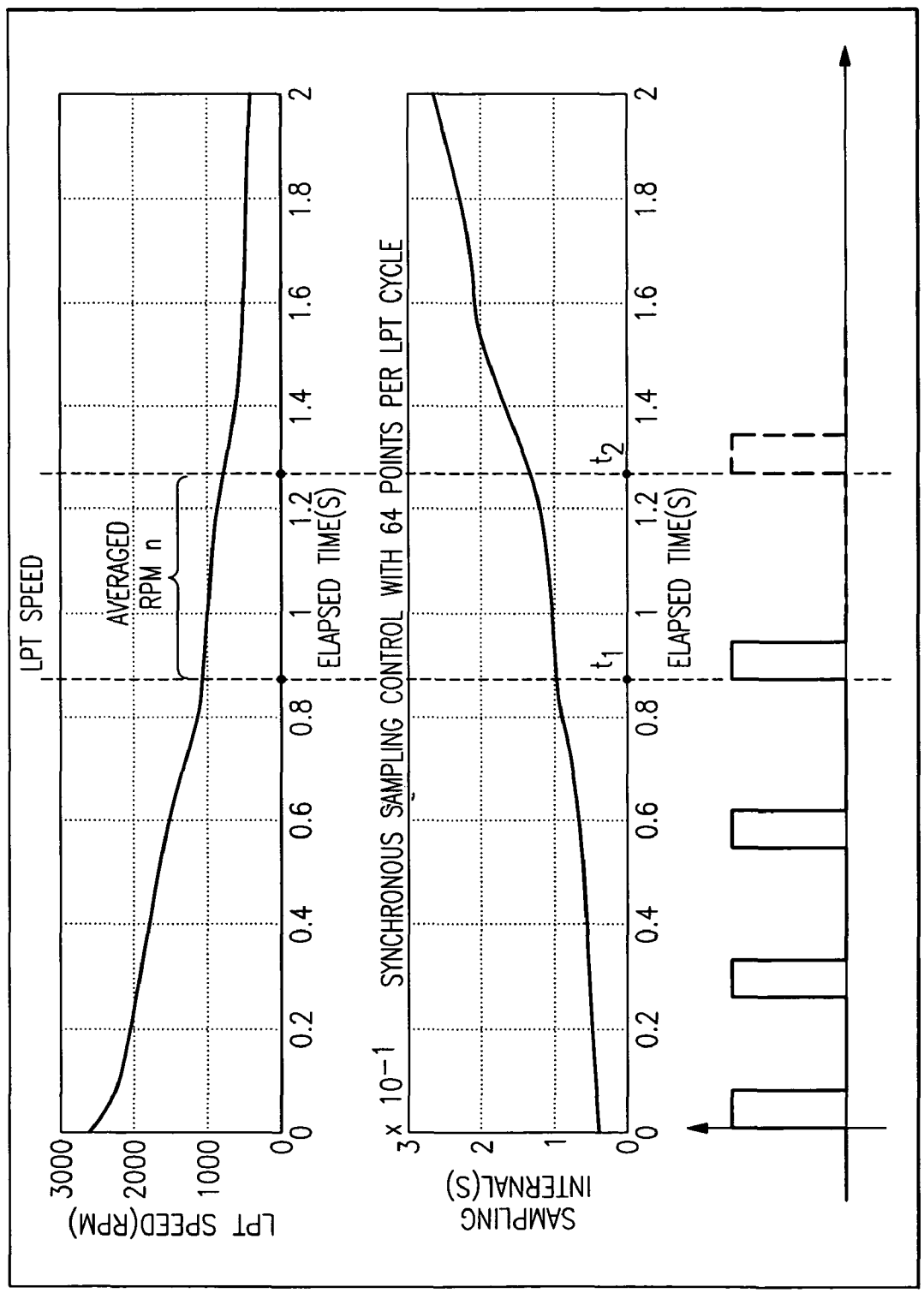
FIG. 4 is a waveform diagram illustrating synthesized tachometer data generated from speed data according to one embodiment of the invention.

Equal time sampled data can be easily converted into equal space data using a tachometer, such as shown in FIG. 3. In case of a missing tachometer signal, and using a known speed (or speed difference) function, a synthesized tachometer signal can be generated from the speed (or speed difference) function; and an equal space sampling can be carried out with steps 1-5 discussed below with reference to FIG. 4, according to one embodiment of the invention.

1) First, assume existence of a tachometer pulse at time zero;
2) Once the $i^{th}$ tachometer pulse is located at time $t_1$, assume the $(i+1)^{th}$ tachometer pulse is located at time $t_2$;
3) Calculate the average shaft speed, n, from $t_1$ to $t_2$ and formulate:

$$\Delta t_1 = t_2 - t_1 \text{ and } \Delta t_2 = 60/n;$$

4) Search $t_2$ such that $|\Delta t_1 - \Delta t_2|$ is minimized and such that $t_2$ is then the approximate location of the $(i+1)^{th}$ tachometer pulse; and
5) Perform synchronous sampling with respect to speed differences once the tachometer signals for each race are obtained.

Figure 5:
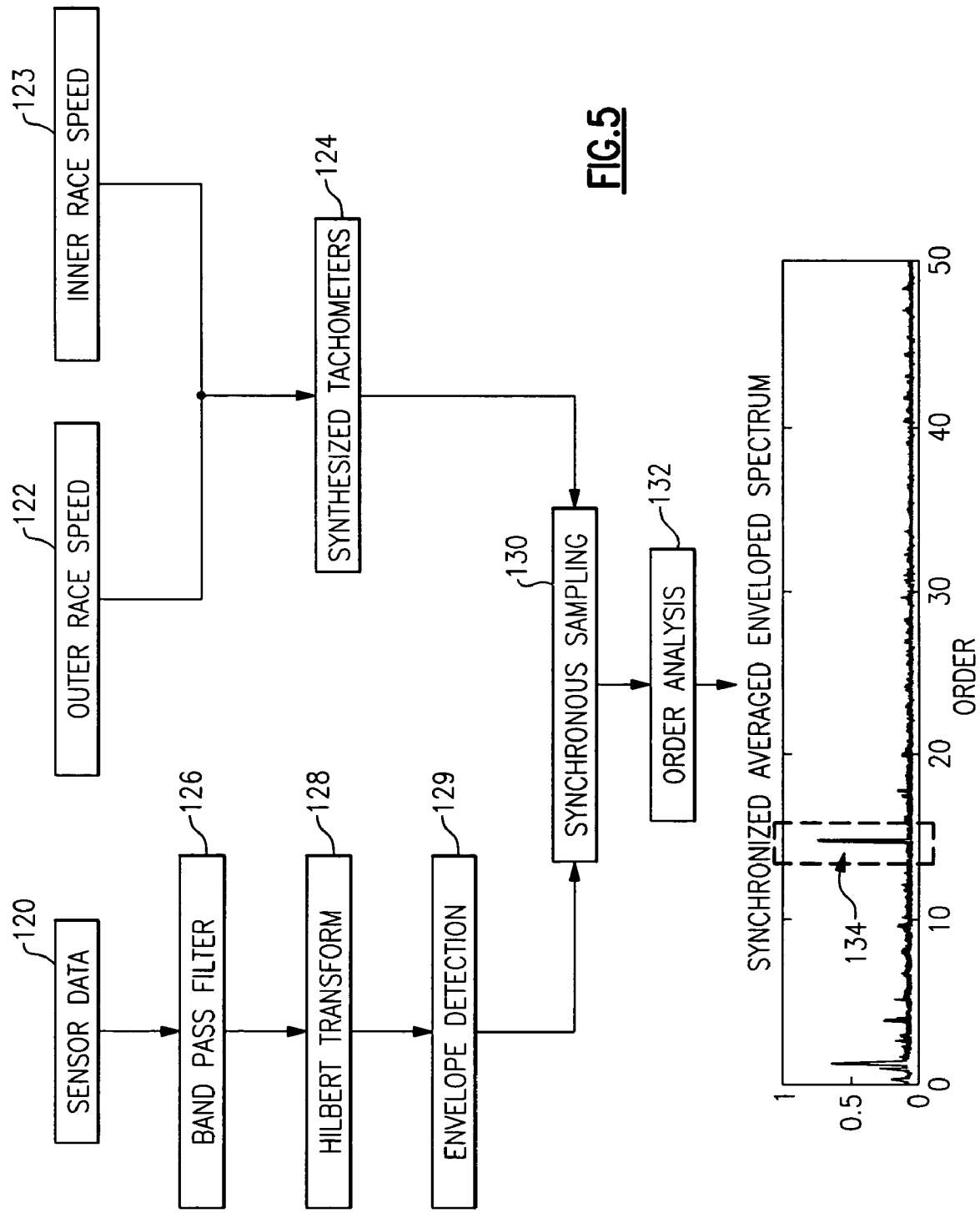
FIG. 5 is a flow chart illustrating a synthesized synchronous sampling technique according to one embodiment of the invention.

FIG. 5 is a flow chart illustrating a synthesized synchronous sampling technique according to one embodiment of the invention. Synthesized synchronous sampling is implemented using vibration sensor data 120 and tachometer (speed) data 122, 123. A synthesized tachometer 124 is implemented using the speed data 122, 123 in the same manner as described above.

The vibration sensor data 120 is preconditioned and digitized at a desired high A/D sampling rate. A band pass filter 126 is then applied to isolate a frequency range of interest, usually above 10 KHz. A Hilbert transform 128 is applied to envelope detection 129 of the isolated signal.

Synchronous sampling 130 is then employed using the synthesized tachometer 124 data and the isolated signal envelope data to convert the time domain envelope into synthesized cycle domain data.

A fast Fourier transform (FFT) is applied to the cycle domain data to generate the desired order analysis 132. The resultant order domain data is averaged to further enhance the differential bearing damage signature(s) as needed. The resultant damage signatures 134 are fixed in the order domain.

The outer race of a differential bearing in one application was embedded with an EDM scratch. Based on Eq. (12) the frequency at the speed configuration was determined to be 1850 Hz, or 15.835 order of the speed difference.

Figure 6:
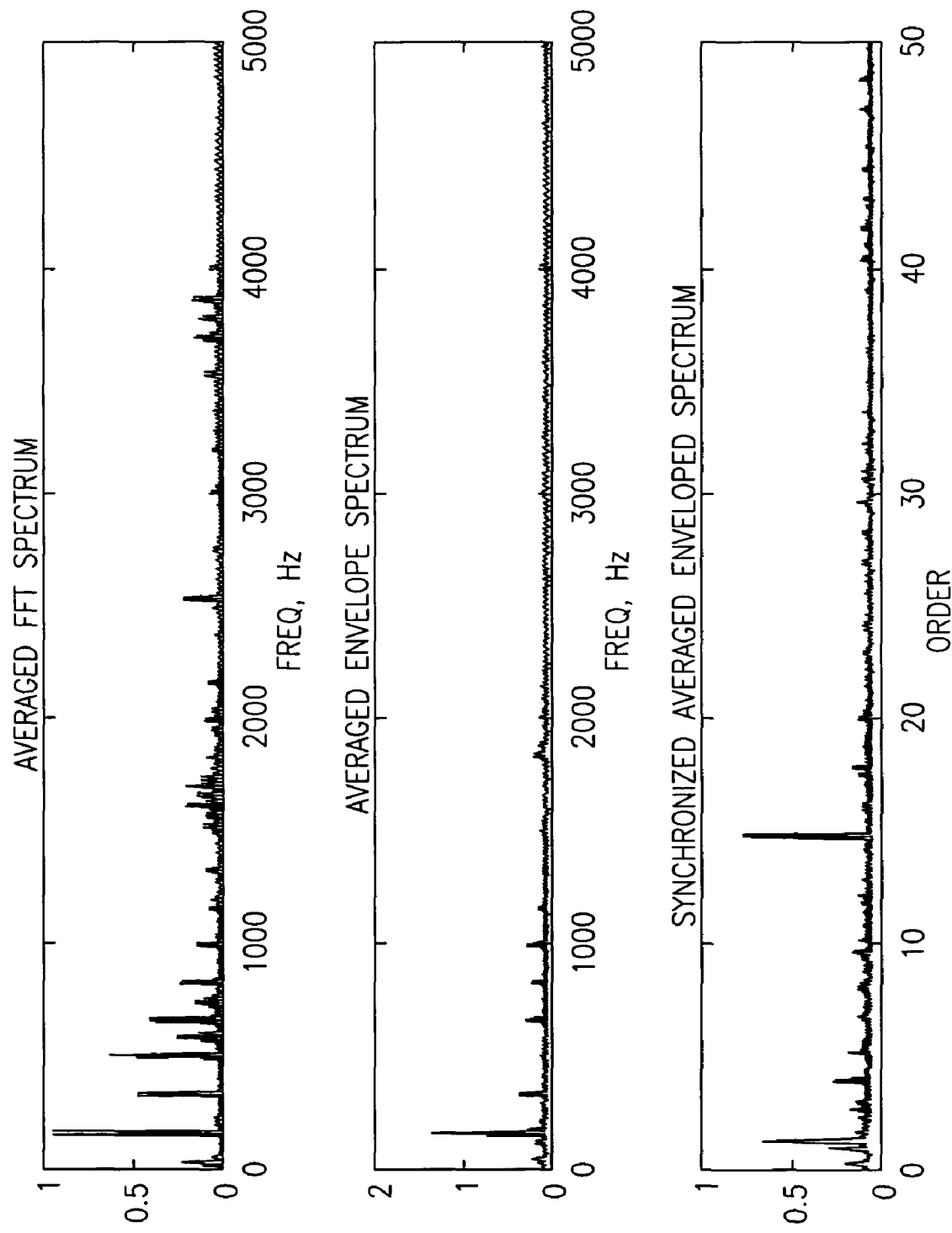
FIG. 6 illustrates a comparison of a synchronized average enveloped spectrum with an averaged FFT spectrum and with an averaged envelope spectrum according to one embodiment of the invention.

Without use of synthesized synchronous sampling and acceleration enveloping techniques described above, it was almost impossible to identify any signature from the regular FFT spectrum of an accelerometer signal, as seen in top portion of FIG. 6.

With regular acceleration enveloping, a small bump around 1850 Hz, as seen in the middle portion of FIG. 6, was barely visible using regular acceleration enveloping techniques. This is because both race speeds are not precisely controlled. A small drift in the race speeds amplified variation at the bearing signature frequency. As a result, the bearing signature was smeared out in the neighborhood of the 1850 Hz.

The damage signature was greatly enhanced on a graphic display device such as, without limitation, a CRT of flat panel display, as seen in the bottom portion of FIG. 6, only when synthesized synchronous sampling techniques according to the principles described herein were applied where the damage signature is precisely located at 14.835 Orders.

The principles described above are suitable for applications such as, without limitation, aircraft engine differential bearing applications in which the engine includes an HP shaft and a LP shaft where both the inner race and outer race are rotating. The principles described above are also suitable for wind turbine applications that employ substantial gearing arrangements and that can generate multiples of harmonics of the fundamental frequency of interest.

Figure 7:
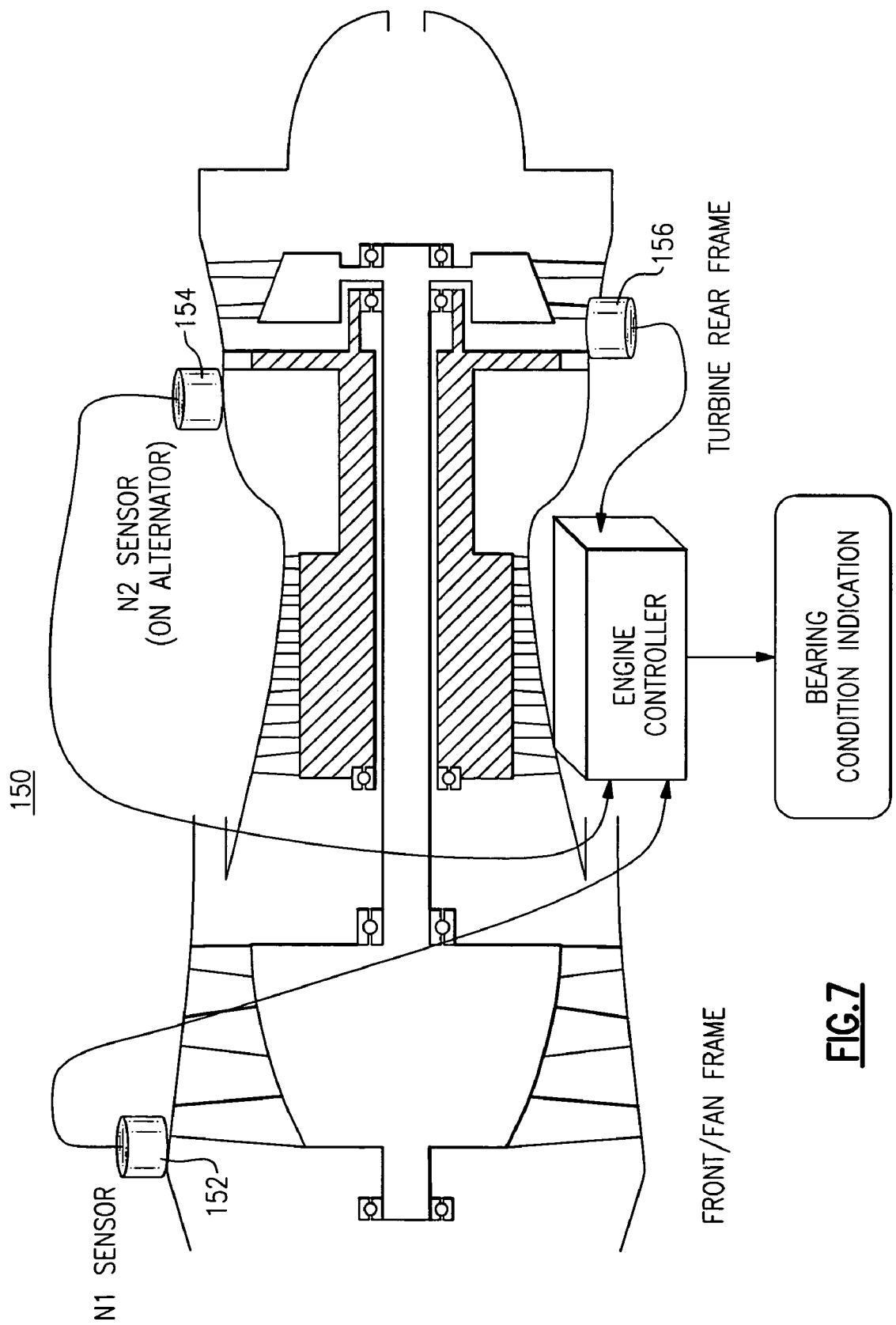
FIG. 7 illustrates placement of speed sensors and an accelerometer at different points on an aircraft engine case according to one embodiment of the invention.

The embodiments described herein can advantageously be employed using one or more broadband sensors that are disposed on an aircraft engine case, far away from the bearing of interest, to provide an extremely low signal to noise ratio environment. FIG. 7 illustrates placement of speed sensors 152, 154 and an accelerometer 156 at different points on an aircraft engine case 150 suitable to provide a workable solution according to one embodiment of the invention.

The principles described above advantageously also provide a technique for conducting synchronization sampling in the time domain and averaging in the frequency (order) domain, eliminating the necessity for a high accuracy tachometer (speed) signal. These principles are suitable for bearing monitoring in applications where shaft rotating speed(s) are variable and a physical tachometer is not feasible.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of detecting differential bearing damages, the method comprising:
   providing a synthesized tachometer configured to generate a speed signal for a differential bearing assembly such that the speed signal corresponds to the approximate location of a missing tachometer signal based on race speeds of the differential bearing assembly;
   providing a sampling mechanism configured to synchronously sample vibration data associated with the differential bearing assembly based on the speed signal to generate synthesized cycle domain data corresponding to at least one damage signature there from;
   causing rotation of the differential bearing assembly and generating a plurality of speed signals for inner and outer rotating bearing races in response to the rotation;
   synthesizing a missing tachometer signal corresponding to the speed difference of the inner and outer races via the synthesized tachometer based upon the plurality of speed signals;
   synchronously sampling bearing vibration data of the differential bearing assembly via the sampling mechanism in response to the synthesized speed difference tachometer signal to generate synthesized cycle domain data corresponding to at least one bearing damage signature of the differential bearing; and
   displaying a spectrum of resultant differential bearing damage signatures in the order domain on a graphic display device in response to the synthesized cycle domain data.

2. The method according to claim 1, wherein synthesizing a speed difference tachometer comprises:
   assuming the existence of a tachometer pulse at a start time;
   locating a tachometer pulse at a first time subsequent to the start time and immediately preceding a missing tachometer pulse;
   assuming the existence of a tachometer pulse at a second time corresponding to the missing tachometer pulse;
   determining an average bearing assembly shaft speed between the first time and the second time; and
   minimizing the absolute value of the difference between a deviation in the first time and a deviation in the second time to determine the approximate location of the at least one synthesized tachometer signal.

3. The method according to claim 1, further comprising applying a fast Fourier transform (FFT) to the synthesized cycle domain data to generate a differential bearing damage signature in the order domain corresponding to increments of orders of differential bearing speed.

4. The method according to claim 3, further comprising applying spectrum averaging to the order domain data to enhance the differential bearing damage signatures.

5. The method according to claim 1, wherein synchronously sampling bearing vibration data in response to the synthesized speed difference tachometer signal to generate synthesized cycle domain data corresponding to at least one bearing damage signature comprises:
   preconditioning and digitizing the vibration data at a desired high A/D sampling rate;
   bandpass filtering the preconditioned and digitized vibration data to isolate signals in a desired frequency range of interest; and
   applying the Hilbert transform to the isolated signals to generate an envelope of the isolated signals.

6. The method according to claim 5, wherein synchronously sampling bearing race vibration data is conducted after generating the envelope of the isolated signals.

7. The method according to claim 1, wherein the inner race and outer races correspond to an aircraft engine differential bearing assembly.

8. The method according to claim 1, wherein the plurality of speed signals are generated via a broadband sensor disposed at a desired location on an aircraft engine case remote from the differential bearing assembly.

9. A method of enhancing a differential bearing damage signature, the method comprising:
   providing a synthesized tachometer configured to generate a speed signal for a differential bearing assembly such that the speed signal corresponds to the approximate location of a missing tachometer signal based on race speeds of the differential bearing assembly;
   providing a sampling mechanism configured to synchronously sample vibration data associated with the differential bearing assembly based on the speed signal to generate synthesized cycle domain data corresponding to at least one damage signature there from;
   causing rotation of the differential bearing assembly and generating a plurality of speed signals for each differential bearing race in response to the rotation;
   synthesizing at least one missing tachometer signal for at least one differential bearing race via the synthesized tachometer based upon the plurality of speed signals;
   synchronously sampling vibration data of the differential bearing assembly with respect to race speed differences via the sampling mechanism in response to the plurality of speed signals and the at least one synthesized tachometer signal to generate synthesized cycle domain data corresponding to at least one bearing damage signature; and
   displaying a spectrum of resultant differential bearing damage signatures in the order domain on a graphic display device in response to the synthesized cycle domain data.

10. The method according to claim 9, further comprising applying a FFT to the synthesized cycle domain data to generate a differential bearing damage signature in the order domain corresponding to increments of orders of differential bearing damage signatures.

11. The method according to claim 10, wherein synthesizing at least one tachometer signal comprises:
  locating a tachometer pulse at a first time subsequent to a start time and immediately preceding a missing tachometer pulse;
  assuming the existence of a tachometer pulse at a second time corresponding to the missing tachometer pulse;
  determining an average bearing assembly shaft speed between the first time and the second time; and
  minimizing the absolute value of the difference between a deviation in the first time and a deviation in the second time to determine the approximate location of the at least one synthesized tachometer signal.

12. The method according to claim 10, further comprising applying spectrum averaging to the order domain data to enhance the differential bearing damage signatures.

13. The method according to claim 9, wherein synchronously sampling vibration data associated with the differential bearing with respect to race speed differences in response to the plurality of speed signals and the at least one synthesized tachometer signal to generate synthesized cycle domain data corresponding to at least one bearing damage signature comprises:
  preconditioning and digitizing the vibration data at a desired high A/D sampling rate;
  bandpass filtering the preconditioned and digitized vibration data to isolate signals in a desired frequency range of interest; and
  applying the Hilbert transform to the isolated signals to generate an envelope of the isolated signals.

14. The method according to claim 13, wherein synchronously sampling bearing race vibration data is conducted after generating the envelope of the isolated signals.

15. The method according to claim 9, wherein the differential bearing comprises one portion of an aircraft engine differential bearing assembly.

16. The method according to claim 15, wherein the at least one synthesized tachometer signal is based on both inner race speeds and outer race speeds.

17. The method according to claim 9, wherein the plurality of speed signals are generated via a broadband sensor disposed at a desired location on an aircraft engine case remote from the differential bearing assembly.

18. A system for detecting differential bearing damage, the system comprising:
  a synthesized tachometer configured to generate a speed signal for a differential bearing assembly such that the speed signal corresponds to the approximate location of a missing tachometer signal based on both inner and outer race speeds of the bearing assembly;
  a sampling mechanism configured to synchronously sample vibration data associated with the differential bearing assembly based on the speed signal to generate synthesized cycle domain data corresponding to at least one differential bearing assembly damage signature; and
  a graphic display device configured to display a spectrum of resultant differential bearing damage signatures in the order domain in response to the synthesized cycle domain data.

19. The system for detecting bearing damage according to claim 18, wherein the bearing assembly comprises an aircraft engine differential bearing.

20. The system for detecting bearing damage according to claim 18, further comprising:
  a vibration sensor configured to monitor each bearing race and generate vibration signals there from; and
  a signal processing means configured to precondition and digitize the vibration signals to generate the vibration data there from.

21. The system for detecting bearing damage according to claim 20, further comprising:
  a bandpass filter configured to filter the preconditioned and digitized vibration data to isolate signals in a desired frequency range of interest; and
  a signal processing means configured to apply a Hilbert transform to the isolated signals to generate an envelope of the isolated signals corresponding to the vibration data.

22. The system for detecting bearing damage according to claim 18, further comprising signal processing means configured to apply a FFT to the synthesized cycle domain data to generate a differential bearing damage signature in the order domain corresponding to increments of orders of differential bearing damage signatures.

23. The method according to claim 22, further comprising signal processing means for applying spectrum averaging to the order domain data to enhance the differential bearing damage signatures.

* * * * *